(12) United States Patent
Sujan et al.

(10) Patent No.: US 10,788,845 B2
(45) Date of Patent: Sep. 29, 2020

(54) OPTIMIZATION OF MISSION EFFICIENCY THROUGH PLATOON OPPORTUNITY ASSESSMENT

(71) Applicant: Cummins Inc., Columbus, IN (US)

(72) Inventors: Vivek A. Sujan, Columbus, IN (US); Timothy J. Proctor, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/208,020

(22) Filed: Dec. 3, 2018

(65) Prior Publication Data

US 2019/0171227 A1 Jun. 6, 2019

Related U.S. Application Data

(60) Provisional application No. 62/593,427, filed on Dec. 1, 2017.

(51) Int. Cl.
| | |
|---|---|
| *B60W 10/06* | (2006.01) |
| *B60W 30/165* | (2020.01) |
| *G05D 1/02* | (2020.01) |
| *G07C 5/00* | (2006.01) |
| *G07C 5/08* | (2006.01) |
| *G08G 1/00* | (2006.01) |
| *H04W 4/46* | (2018.01) |

(52) U.S. Cl.
CPC ........... *G05D 1/0295* (2013.01); *B60W 10/06* (2013.01); *B60W 30/165* (2013.01); *G05D 1/0293* (2013.01); *G07C 5/008* (2013.01); *G07C 5/0816* (2013.01); *H04W 4/46* (2018.02); *B60W 2556/65* (2020.02)

(58) Field of Classification Search
CPC .............. B60W 30/165; B60W 10/06; B60W 2550/408; G07C 5/008; G07C 5/0816; G05D 1/0295; G05D 1/0293; G08G 1/22; H04W 4/46
USPC .......................................................... 701/96
See application file for complete search history.

(56) References Cited

U.S. PATENT DOCUMENTS

| | | | |
|---|---|---|---|
| 6,032,097 A | 2/2000 | Iihoshi et al. | |
| 8,352,111 B2 | 1/2013 | Mudalige | |
| 8,989,915 B2 | 3/2015 | Yamashiro | |
| 9,396,661 B2 | 7/2016 | Okamoto | |
| 9,423,794 B2 | 8/2016 | Lind et al. | |
| 2010/0256852 A1* | 10/2010 | Mudalige | ............... G08G 1/163 701/24 |

(Continued)

FOREIGN PATENT DOCUMENTS

WO WO2016065055 A1 4/2016

*Primary Examiner* — Behrang Badii
*Assistant Examiner* — Hossam M Abd El Latif
(74) *Attorney, Agent, or Firm* — Faegre Drinker Biddle & Reath LLP

(57) ABSTRACT

A method, an optimization controller, and combustion engine are disclosed. The method includes determining, by an optimization controller, values of a performance parameter of a target vehicle using characteristics of at least two platoons travelling on a roadway, each of the values corresponding to a platoon of the at least two platoons; selecting, by the optimization controller, one of the at least two platoons based on a comparison of the values of the performance parameter, and coordinating, by the optimization controller, for the target vehicle to join the selected of the at least two platoons.

18 Claims, 9 Drawing Sheets

(56) References Cited

U.S. PATENT DOCUMENTS

| | | | |
|---|---|---|---|
| 2016/0019792 A1* | 1/2016 | Kawamata | G07C 5/085 |
| | | | 701/70 |
| 2016/0054736 A1 | 2/2016 | Kolhouse et al. | |
| 2016/0075333 A1 | 3/2016 | Sujan et al. | |
| 2016/0082964 A1 | 3/2016 | Chunodkar et al. | |
| 2016/0084180 A1 | 3/2016 | Zhu et al. | |
| 2016/0086132 A1 | 3/2016 | Sujan et al. | |
| 2016/0253924 A1* | 9/2016 | Kwak | G09B 19/167 |
| | | | 701/123 |
| 2017/0001639 A1 | 1/2017 | Dempsey et al. | |
| 2017/0043776 A1 | 2/2017 | Sujan et al. | |
| 2017/0080919 A1 | 3/2017 | Follen et al. | |
| 2017/0089274 A1 | 3/2017 | Kolhouse et al. | |
| 2017/0115666 A1 | 4/2017 | Kolhouse et al. | |
| 2017/0129492 A1 | 5/2017 | Follen et al. | |
| 2017/0293296 A1* | 10/2017 | Stenneth | G06Q 20/10 |
| 2018/0018605 A1* | 1/2018 | Light-Holets | G06Q 20/405 |
| 2018/0188746 A1* | 7/2018 | Lesher | B60W 40/08 |

* cited by examiner

1: Determine the number of vehicles in the platoon (n)
2: Determine the route for each vehicle (1..n)
3: Determine the total number of active fault codes on each of m vehicles (m = 1..n). These may include fault codes from engine, powertrain, and other electronic systems on board.
4: Determine the history of last service event of each of the m vehicles (m = 1..n)
5: Determine the current max power capability of each of the m vehicles (m = 1..n)
6: Determine the current max braking power available to each of the m vehicles (m = 1..n). This is based on the current wear estimates, brakes pressure available, and temperature of the brake pads.
7: Determine the current min stopping distance for each of the m vehicles (m = 1..n) travelling at the current platoon average speed. This will be based on the GVW of each vehicle combined with the max braking power available to each of the vehicles.
8: Health of the platoon may be defined in a number of ways
   (a) each of the measures from step 3 – step 7 are used as raw information
   (b) these may be combined using some weighted avg for the full platoon:

$H = \alpha_1 \times$ (Avg num of fault codes) $+ \alpha_2 \times$ (Avg time to last service event) $+ \alpha_3 \times$ (Avg power capability) $+ \alpha_4 \times$ (Avg brake capability) $+ \alpha_5 \times$ (Avg stopping distance)

Figure 4

1: Determine the number of vehicles in the platoon (n)

2: Determine the route for each vehicle (1..n)

3: Determine total max distance overlap of m vehicles (m = 2..n)

4: Label lengths segments based on ADASis format (with GPS location at key trasitions)

5: Broadcast full or partial descriptor based on percentage of platoon information being requested i.e. 100% translates to all vehicles, 50% translates to half the number of vehicles, etc. Also, request may only want distance, but may also want route. Either information can be broadcasted.

Figure 5

1: Determine fuel consumption if joining leading platoon
1a: Determine min catch up time to forward platoon (including ability)
1b: Determine fuel consumed in catching up to forward platoon
1c: Determine the avg time to destination, $t_{avg\_forward}$, based on the avg speed of forward platoon
1d: Determine the fuel consumption rate in reaching the destination based on avg platoon speed, road terrain, and location as tail platoon vehicle 2: Determine fuel consumption if joining trailing platoon
2a: Determine min catch up time to rear platoon (at road speed limit - safety)
2b: Determine fuel consumed in catching up to rear platoon
2c: Determine the avg time to destination, $t_{avg\_rear}$, based on the avg speed of rear platoon
2d: Determine the fuel consumption rate in reaching the destination based on avg platoon speed, road terrain, and location as lead platoon vehicle 3: Determine which option results in time to destination $< t_{destination}$ with lower fuel consumption rate
OUTPUT TARGET PLATOON AND POSITION
OUTPUT VEHICLE TARGET VELOCITY PROFILE 4: Determine separation distance based on mass
Forward platoon: assume last vehicle has lowest Class mass -> use knowledge of current known mass to determine max braking stopping distance for both vehicles, and use difference as min separation distance
Rear platoon: assume first vehicle has max Class mass -> use knowledge of current known mass to determine max braking stopping distance for both vehicles and use difference as min separation distance
OUTPUT INTRA-PLATOON SEPARATION DISTANCE

Figure 7

1: Determine fuel consumption if joining leading platoon
1a: Determine min catch up time to forward platoon (including ability)
1b: Determine impact of traffic to forward platoon on catch up time based on average traffic speed, number of vehicles in traffic, and rate of increase/decrease of traffic vehicles
1c: Determine fuel consumed in catching up to forward platoon (including impact of traffic determined in Step 1b)
1d: Determine the avg time to destination, $t_{avg\_forward}$, based on the avg speed of forward platoon
1e: Determine the fuel consumption rate in reaching the destination based on avg platoon speed, road terrain, and location as tail platoon vehicle (including catch up due to traffic)

2: Determine fuel consumption if joining trailing platoon
2a: Determine min catch up time to rear platoon (at road speed limit − safety)
2b: Determine impact of traffic to forward platoon on catch up time based on average traffic speed, number of vehicles in traffic, and rate of increase/decrease of traffic vehicles
2c: Determine fuel consumed in catching up to rear platoon
2d: Determine the avg time to destination, $t_{avg\_rear}$, based on the avg speed of rear platoon
2e: Determine the fuel consumption rate in reaching the destination based on avg platoon speed, road terrain, and location as lead platoon vehicle (including catch up due to traffic)?

3: Determine which option results in time to destination $<t_{destination}$ with lower fuel consumption rate
OUTPUT TARGET PLATOON AND POSITION
OUTPUT VEHICLE TARGET VELOCITY PROFILE

4: Determine separation distance based on mass
Forward platoon: assume last vehicle has lowest Class mass -> use knowledge of current known mass to determine max braking stopping distance for both vehicles, and use difference as min separation distance
Rear platoon: assume first vehicle has max Class mass -> use knowledge of current known mass to determine max braking stopping distance for both vehicles and use difference as min separation distance

OUTPUT INTRA-PLATOON SEPARATION DISTANCE

Figure 8

1: Determine fuel consumption if joining leading platoon
1a: Determine min catch up time to forward platoon (including ability)
1b: Determine impact of traffic to forward platoon on catch up time based on average traffic speed, number of vehicles in traffic, and rate of increase/decrease of traffic vehicles
1c: Determine fuel consumed in catching up to forward platoon (including impact of traffic determined in Step 1b)
1d: Determine the avg time to destination, $t_{avg\_forward}$, based on the avg speed of forward platoon
1e: Determine the fuel consumption rate in reaching the destination based on avg platoon speed, road terrain, and location as tail platoon vehicle (including catch up due to traffic)

2: Determine fuel consumption if joining trailing platoon
2a: Determine min catch up time to rear platoon (at road speed limit – safety)
2b: Determine impact of traffic to forward platoon on catch up time based on average traffic speed, number of vehicles in traffic, and rate of increase/decrease of traffic vehicles
2c: Determine fuel consumed in catching up to rear platoon
2d: Determine the avg time to destination, $t_{avg\_rear}$, based on the avg speed of rear platoon
2e: Determine the fuel consumption rate in reaching the destination based on avg platoon speed, road terrain, and location as lead platoon vehicle (including catch up due to traffic)?

3a: Determine number of neighboring vehicles requiring a platoon (n)
3b: Determine avg time to destination of 1..n vehicles based on avg speed of new platoon set by self
3c: Determine fuel consumption rate for each 1..n vehicles + self vehicle in new platoon
3d: Determine fuel consumption rate for each of 1..n vehicles in forward platoon
3e: Determine fuel consumption rate for each of 1..n vehicles in rear platoon 4: Determine which option results in time to destination <$t_{destination}$ with lower fuel consumption rate for self
OUTPUT TARGET PLATOON AND POSITION
OUTPUT VEHICLE TARGET VELOCITY PROFILE 5: Determine separation distance based on mass
Forward platoon: assume last vehicle has lowest Class mass –>use knowledge of current known mass to determine max braking stopping distance for both vehicles, and use difference as min separation distance
Rear platoon: assume first vehicle has max Class mass –> use knowledge of current known mass to determine max braking stopping distance for both vehicles and use difference as min separation distance
New platoon: vehicles that gain by forming new platoon are informed and ordering based on current order with separation distance computed as above
OUTPUT INTRA-PLATOON SEPERATION DISTANCE
OUTPUT: INFORM NEIGHBORING ENTRY VEHICLES

Figure 9

OPTIMIZATION OF MISSION EFFICIENCY THROUGH PLATOON OPPORTUNITY ASSESSMENT

CROSS-REFERENCE TO RELATED APPLICATIONS

The present application claims the benefit of priority from U.S. Provisional Patent Application No. 62/593,427, filed on Dec. 1, 2017, which is incorporated in its entirety herein by reference thereto.

TECHNICAL FIELD

The present disclosure relates generally to optimization of mission efficiency through platoon opportunity assessment, and, more specifically, to the evaluation of opportunities of vehicles to join vehicle platoons.

BACKGROUND

Vehicle platooning, or platooning, entails a group of vehicles that can travel very closely together safely at high speed. Platooning enables the vehicles to reduce fuel consumption by drafting. The lead vehicle may control the speed and direction of the platoon, in which case the other members of the platoon may apply precisely matched braking and acceleration to respond to the lead vehicle's movement.

Drafting opportunities vary over time based on terrain, destinations, traffic and other variables. Opportunities exist to improve fuel efficiency, mission performance, and other variables through platoon opportunity assessment.

SUMMARY OF THE DISCLOSURE

A method, an optimization controller, and a combustion engine are disclosed. In some embodiments, the combustion engine comprises the optimization controller. The optimization controller maybe onboard or offboard and may be programmed to perform the method disclosed. According to the method, mission performance may be improved by organizing target vehicles relative to platoons based on their characteristics.

In some embodiments, a method for selecting a platoon is provided. The method comprises determining, by an optimization controller, values of a performance parameter of a target vehicle using characteristics of at least two platoons travelling on a roadway, each of the values corresponding to a platoon of the at least two platoons; selecting, by the optimization controller, one of the at least two platoons based on a comparison of the values of the performance parameter, and coordinating, by the optimization controller, for the target vehicle to join the selected of the at least two platoons.

In some embodiments, a combustion engine for a target vehicle, the combustion engine comprising: an engine controller; a vehicle-to-vehicle (V2V) transceiver to receive platoon characteristics from at least two platoons traveling on a roadway; and an optimization controller communicatively coupled with the engine controller and the V2V transceiver, the optimization controller including optimization logic operable to: determine values of a performance parameter of the target vehicle using the characteristics of the at least two platoons travelling on a roadway, each of the values corresponding to a platoon of the at least two platoons; select one of the at least two platoons based on a comparison of the values of the performance parameter; and coordinate for the target vehicle to join the selected of the at least two platoons.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein:

FIGS. 4 and 5 are listings of process steps to determine platoon health and platoon route;

FIGS. 7, 8 and 9 are listings low, medium, and high complexity process steps to optimize platooning decisions.

Figure 1:
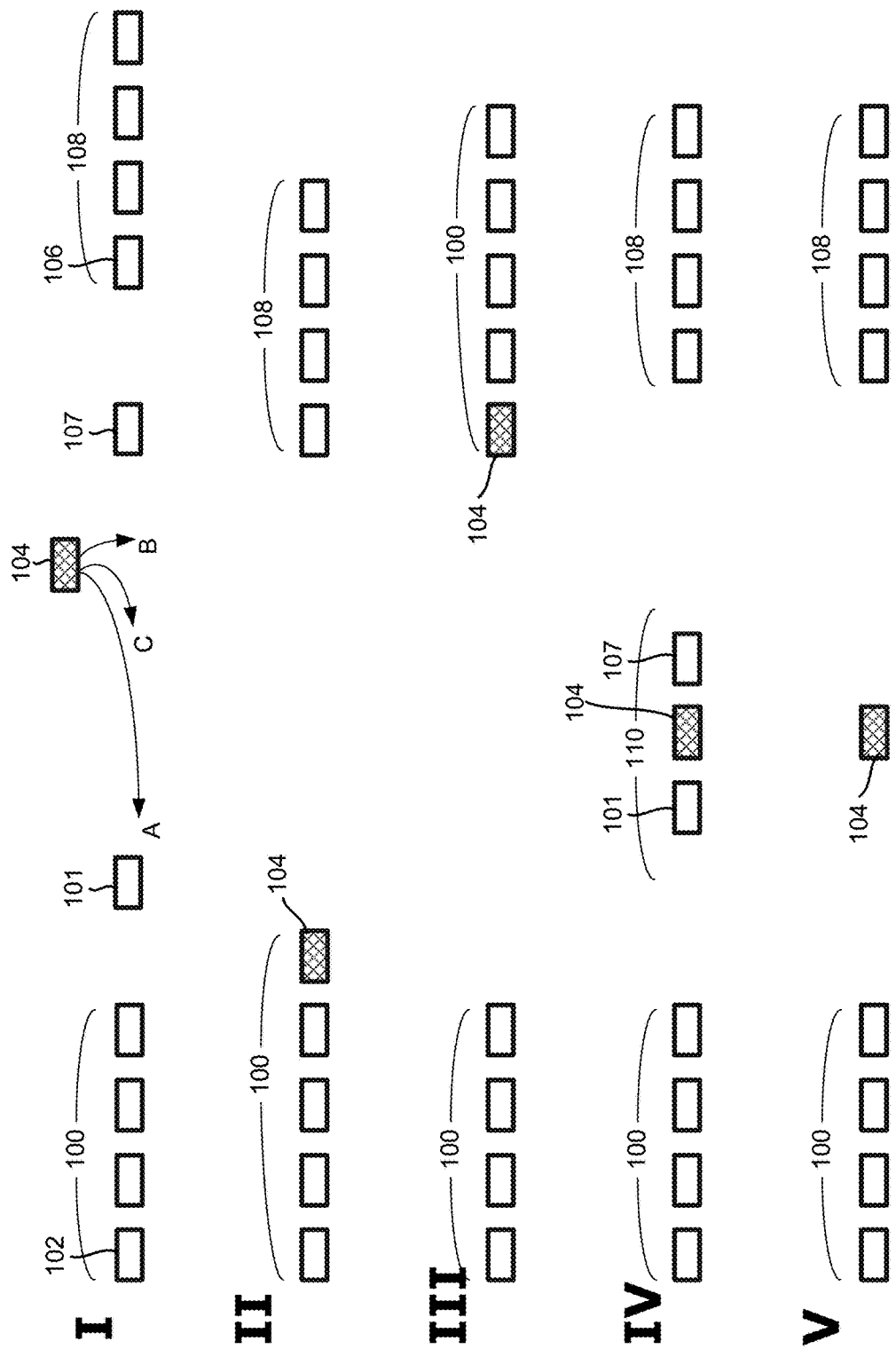
FIG. 1 is a block diagram depicting a plurality of platooning scenarios.

Although the drawings represent embodiments of the various features and components according to the present disclosure, the drawings are not necessarily to scale and certain features may be exaggerated in order to better illustrate and explain the present disclosure. The exemplification set out herein illustrates embodiments of the disclosure, and such exemplifications are not to be construed as limiting the scope of the disclosure in any manner.

DETAILED DESCRIPTION

For the purpose of promoting an understanding of the principles of the disclosure, reference will now be made to the embodiments illustrated in the drawings, which are described below. The embodiments were selected for description to enable one of ordinary skill in the art to practice the invention. No limitation of the scope of the invention is intended by the selection of the illustrated embodiments.

Vehicle platooning entails a group of vehicles that can travel very closely together safely at high speed. The vehicles may communicate with each other to coordinate speed, spacing, braking and other information usable by the vehicles to increase safety, fuel efficiency, or mission parameters. Doing so enables the vehicles to reduce fuel consumption by drafting. The lead vehicle may control the speed and direction of the platoon, in which case the other members of the platoon apply precisely matched braking and acceleration to respond to the lead vehicle's movement.

The formation and organization of platoons can change due to differences in the destinations of the platoon members, breakdowns, addition of members, and other reasons. Embodiments of the disclosure provide optimization methods implemented in optimization controllers comprising instructions executable to implement the methods. The methods evaluate selected variables pertaining to vehicle mass and shape, vehicle health, and vehicle route, and other static and dynamic environment variables, and determine platoon organizations that optimize economic value. Because the evaluation may comprise many platoons and vehicles, limits may be applied to reduce the number of permutations that must be considered to determine the optimal economic value, effectively reducing computational cost and network bandwidth requirements while simultaneously increasing response time. The methods also provide effective mechanisms for communicating the values of the variables so that individual vehicles can make platooning determinations. Platooning determinations can also be made by an offboard optimization controller.

In various embodiments, an optimization controller is configured to determine whether a target vehicle should join a leading platoon, join a trailing platoon, or form a new platoon. The target vehicle could be a vehicle entering the roadway on which the platoons travel (an "entering" vehicle), could be a vehicle that is a member of a platoon but wishes to join a different platoon, may be a vehicle being passed by a platoon, and may also be a vehicle intent on forming a new platoon. To join a leading platoon the target vehicle would increase speed to catch-up, which requires additional fuel, to then improve fuel efficiency by drafting the last member of the leading platoon. To join a trailing platoon the target vehicle would match the speed of the trailing platoon, which may require less fuel than is needed to catch-up to the leading platoon, but then the target vehicle would lead the trailing platoon, which is less efficient than drafting the leading platoon. Alternatively, the target vehicle could form a new platoon by joining vehicles that are not members of any platoon or that may benefit by changing platoons. Of course the target vehicle may also enter the roadway without joining or forming a platoon or may join a platoon in a position between the first and last member of the platoon. Some of these choices are illustrated in FIG. 1, which includes 5 scenarios denoted by roman numerals I to V. In scenario I, a leading platoon 100 is followed by vehicles 101 and 107, and a trailing platoon 108. Vehicles 102 and 106 lead the leading and trailing platoons 100, 108. The terms leading and trailing relate to the position of a target vehicle 104, which has choices A, B, and C, corresponding to joining leading platoon 100, joining trailing platoon 108, or joining neither. Scenario II illustrates choice A. Scenario III illustrates choice B. Scenarios IV and V illustrate options of choice C, comprising forming a new platoon 110 and not joining a platoon.

There are a multitude of variables and constraints to consider when determining an optimum course of action. An optimization controller might factor mission constraints of the target vehicle, including trip time, destination and minimum fuel consumption. The optimization controller might factor distance, speed and terrain profile relative to the leading platoon; distance, speed and terrain profile relative to the trailing platoon; traffic between the target vehicle and other platoons; other vehicles on the present roadway entry ramp wanting to join a platoon, and their characteristics and dynamic parameters (weight, destinations, target and average speeds, etc.); maximum velocity of the target vehicle; forward road grade profiles; fuel maps of the vehicles; road speed limits; intra-platoon separation distances; and other variables.

The optimization controller might also factor the health of the vehicles (described below) and the routes of the vehicle (described below). Routes determine when vehicles will leave a platoon, either because they reached their destinations or because their destinations require a route different than the route being followed by the platoon. Every instance of a departing vehicle is a disruption that may result in reorganization of the platoon. Health represents the risk that a vehicle will have to leave the platoon (also a disruption), for example because the platoon breaks-up due to vehicles breaking down or the platoon parameters become inefficient due to limitations imposed by the health condition of its members. The disruptions of the platoon can also impact whether the joining vehicle will be able to remain in a drafting position or will have to lead. The optimization controller might also factor environmental variables, including weather, traffic, accident reports, and other variables that would affect the routes, and any other variables that would have an economic impact, directly or indirectly, certain or probable, on the vehicles and therefore would influence the platoon organization, or platooning, decisions.

The optimum course of action might entail selecting a platoon based on a performance characteristic, e.g. reaching the destination on time, minimizing fuel consumption, etc. Determining values of the performance characteristic may comprise calculating the performance characteristic in any manner known in the art, e.g. estimating travel time or fuel consumption, for example. More than one performance characteristic may be evaluated. For example various performance thresholds, e.g. health or route overlap, may be used to prevent joining of a target vehicle and a platoon if the platoon's thresholds are higher/lower than the target vehicle's performance parameter. Fuel consumption may be determined with different granularity. In one example, fuel consumption is determined by dividing the distance to be travelled (e.g. miles) by the actual average fuel consumption (miles per gallon, or mpg) of a vehicle e.g. miles/mpg=gallons of fuel. In another example, the actual average fuel consumption is weighed or calibrated by changes in the expected distance to be travelled, for example changes in wind speed and direction, elevation changes, and/or traffic density (urban vs. rural areas), and/or anticipated speed changes due to known traffic events such as construction or accidents. Any known model for determining fuel consumption may be used. The models generally comprise formulas, or maps, that account for the air resistance (aerodynamic drag) experienced by the vehicle at various speeds, the effect of gravity as the vehicle experiences different road grades, and the variations in speed due to terrain, traffic density, and other factors that may cause the driver to brake and then accelerate. Another factor in the model may be whether the target vehicle will be positioned in a leading or not leading position in a platoon. For example, a drafting vehicle will consume less fuel than a leading vehicle travelling at the same speed. The separation distance between vehicles in a platoon would also influence the drafting effect. In one example, to determine whether a target vehicle will use more or less fuel in a first platoon or a second platoon, the speeds of the platoons are used in the models to estimate first and second fuel consumptions to determine which of the first or second fuel consumptions is greater. The target vehicle is assumed to draft in the first platoon, which is in front of the target vehicle, and to lead or draft in the second platoon. Of course, the target vehicle may also lead the first platoon for various reasons, particularly if the economic benefits are shared.

Fuel maps are well known. Fuel maps correlate engine speed and load with fueling in various areas of operation of the engine. Variations in terrain can be used to predict expected variations in engine load, and thus fuel consumption variations due to terrain changes. Similarly, wind, drafting affects, and other factors can be used to estimate load changes and thereby fuel consumption variations. Of course, another factor is weight. To estimate fuel consumption considering the foregoing variations, fuel consumptions can be estimated for discrete portions of the distance to be travelled, e.g. flat portions, rising portions, slow portions, etc., and the fuel consumptions for the discrete portions (the sum of the portions of the distance account for the total distance to be travelled). The fuel consumptions for the portions are added to calculate the fuel consumption for the distance to be travelled.

In some embodiments the optimization controller analyzes the variables and constraints using data received from the vehicles, and after determining the optimal course of action communicates such determination to the vehicles. In one example, the optimization controller utilizes a vehicle-to-infrastructure (V2I) network. Generally, a V2I network comprises access by a vehicle to infrastructure and may comprise access points, cellular networks, and other networks. A V2I network is an embodiment of a vehicle-to-everything (V2X) network, which encompasses communications from to or from a vehicle to any apparatus not in the vehicle, such as another vehicle (V2V), a pedestrian (V2P), a device (V2D), and a grid (V2G). V2X communications are based on wide local area network technology.

In one variation, communicating such determinations includes coordinating for a target vehicle to join a platoon. In one example, coordinating for a target vehicle to join a platoon entails an optimization controller transmitting instructions to the target vehicle to join the platoon. The instructions may include the platoon's dataset and may include a position in the platoon for the target vehicle. With this information the vehicle controller of the target vehicle can determine whether to increase or decrease speed to reach the platoon. In another example, coordinating for a target vehicle to join a platoon entails an optimization controller transmitting information to the target vehicle to join the platoon. The information may include the platoon's dataset and may include a position in the platoon for the target vehicle. With this information the vehicle controller of the target vehicle can determine whether speed increase or decrease is needed to reach the platoon and may display the required information for a driver to control the vehicle accordingly. In a further example, coordinating for a target vehicle to join a platoon entails an optimization controller transmitting instructions to the platoon to receive the target vehicle. The instructions may include the target vehicle's dataset and may include a position in the platoon for the target vehicle. With this information the vehicle controller of a vehicle in the platoon can instruct other members to create a space for the target vehicle, for example. The vehicle controller may also edit the platoon's dataset to include the target vehicle.

Figure 2:
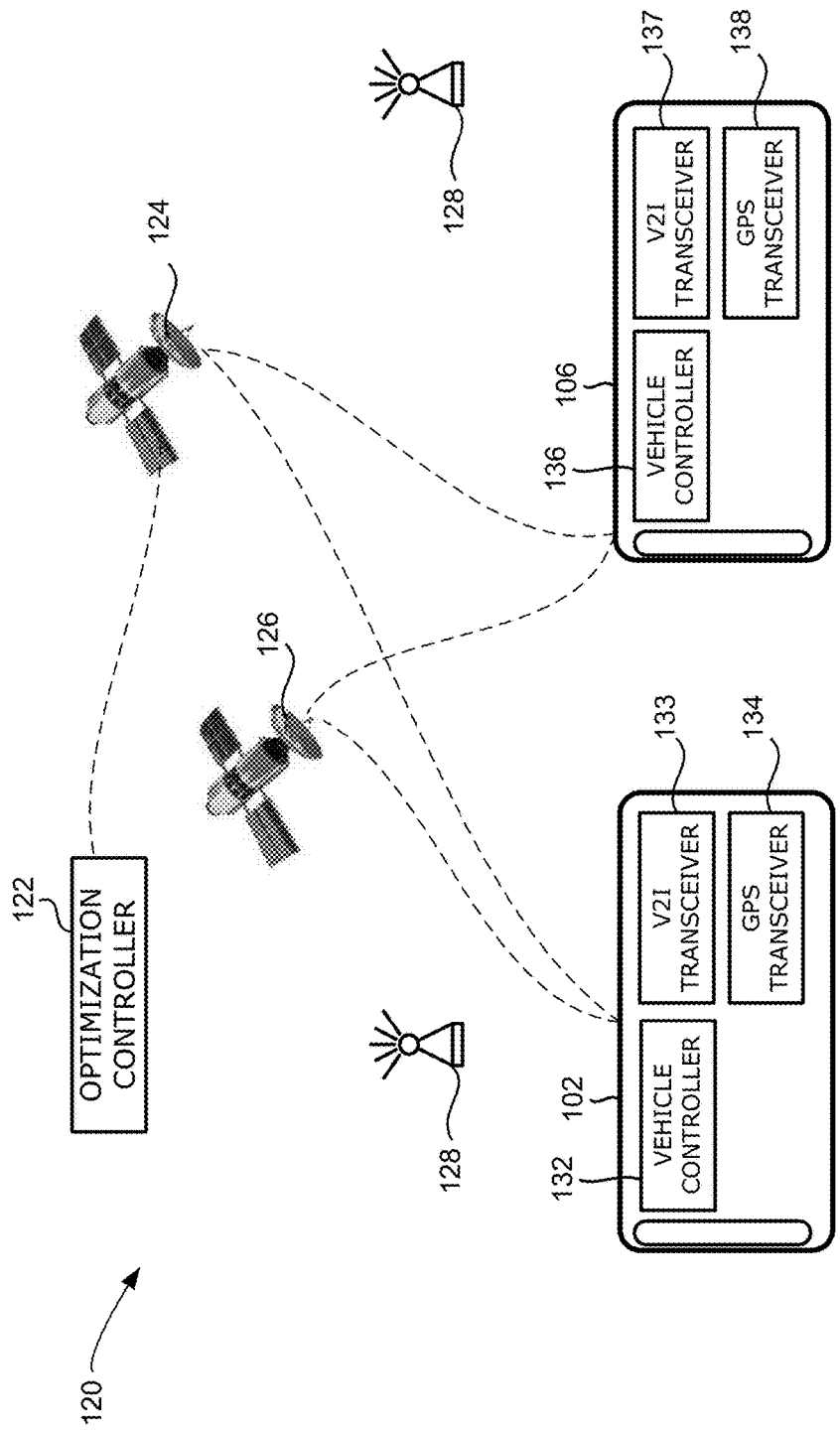
FIG. 2 is a diagram of an embodiment of an optimization network comprising two vehicles and an offboard optimization controller.

Referring to FIG. 2, an embodiment of an optimization network, denoted by numeral 120, comprises an optimization controller 122 communicatively coupled by a satellite network 124 to a pair of vehicle controllers 132 and 136 which gather position data relative to the positions, respectively, of vehicles 102 and 106, which include transceivers to communicate the vehicle data to optimization controller 122. A transceiver may be a V2V transmitter/receiver operable to exchange data with other vehicles using short-range communications. A transceiver may be a V2I transmitter/receiver operable to exchange data with satellite network 124 or Access Points 128. V2I transceivers 133, 137 are shown. A global positioning system (GPS) network 126 comprises or is comprised by, as is well known in the art, multiple satellites that cooperate to pinpoint the location of GPS receivers, in the present embodiment the GPS receivers 134, 138 being located in vehicles 102 and 106 and communicatively coupled with or comprised in vehicle controllers 132, 136. With the vehicle data from all the vehicles on the roadway optimization controller 122 can determine the optimal course of action. Optimization controller 122 may also have access to terrain data, weather data, traffic data, emergency responder data, and any other data which may impact the determination of the optimal course of action. Some of the data, such as terrain data, may be static. Other data, such as traffic data, is dynamic. As used herein dynamic data is data which can generally change sufficiently fast to affect the determination of the optimal course of action. Weather data, for example, although it fluctuates over time, changes relatively slowly and can be considered static data in most instances.

Figure 3:
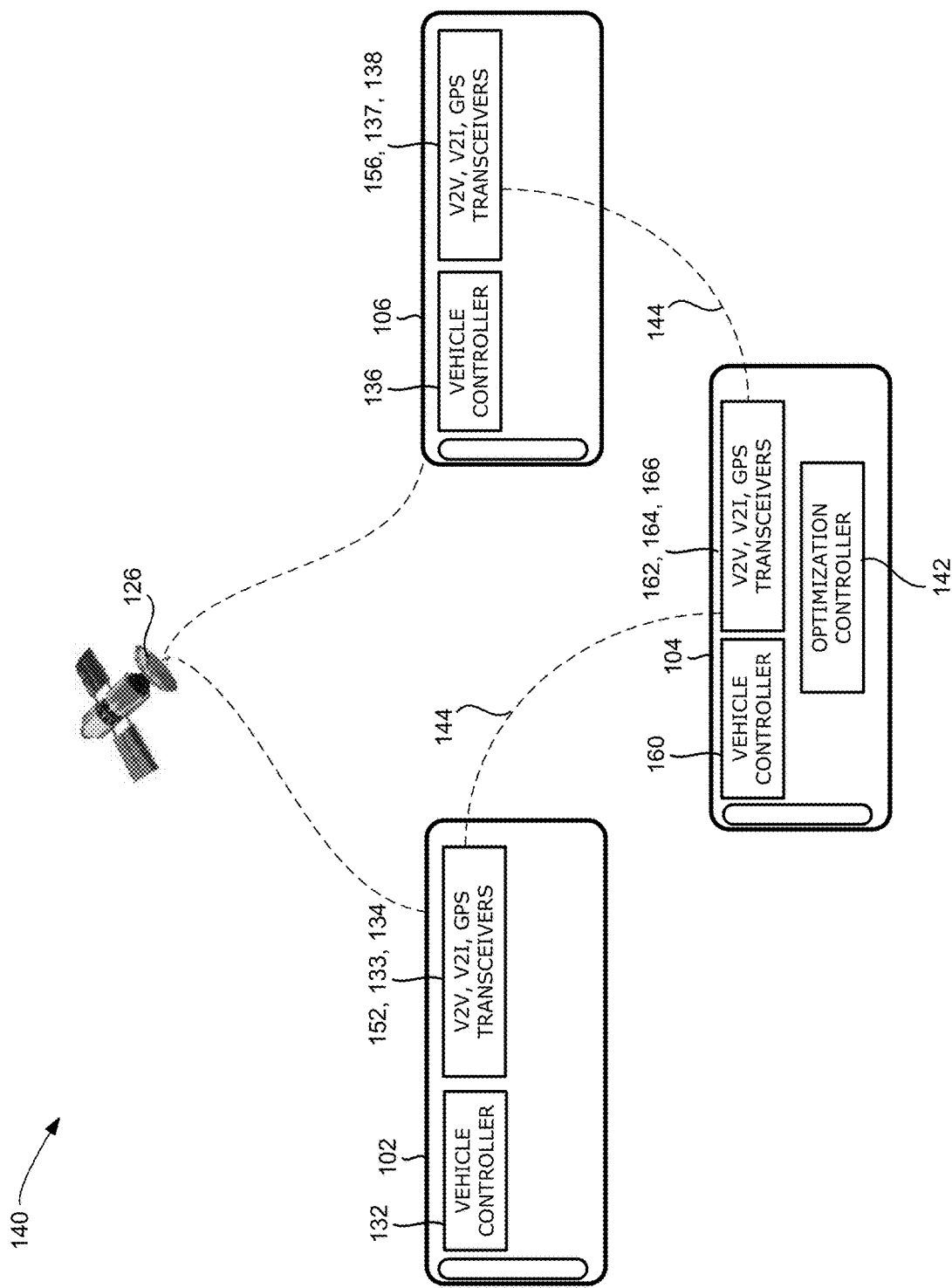
FIG. 3 is a diagram of an embodiment of an optimization network comprising two vehicles and an onboard optimization controller.

In some embodiments of an optimization network, the optimization controller is an onboard controller. Referring to FIG. 3, the optimization network, denoted by numeral 140, comprises an optimization controller 142 onboard vehicle 104 and communicatively coupled to another vehicle by a V2V network 144 comprising transceivers 152, 156, 162 located on each vehicle to communicate the vehicle data to optimization controller 142. Each or some of the vehicles may comprise an optimization controller. Vehicle 104 comprising a vehicle controller 160 is operable to perform a method including receiving a first platoon dataset from a first vehicle controller (vehicle controller 132 in FIG. 3) of a first platoon of vehicles and a second platoon dataset from a second vehicle controller (vehicle controller 136 in FIG. 3) of a second platoon of vehicles travelling on a roadway; determining, based on a present location and a target destination of target vehicle 104, a first expected fuel consumption value of the target vehicle based on the target vehicle joining the first platoon and a second expected fuel consumption value of the target vehicle based on the target vehicle joining the second platoon; and transmitting instructions (to and thereby from transceivers 162, 164) for the target vehicle to join the first platoon if the second expected fuel consumption value is greater than the first expected fuel consumption value. The joining instructions may include instructions for vehicle controller 160 to plot a joining speed profile and for vehicle controller 132 to recognize a new member of the first platoon. After vehicle 104 becomes a member of the first platoon, vehicle controllers 132 and 160 cooperate to maintain a calculated separation distance, as described below. Vehicle 104 further comprises a GPS transceiver 166 communicatively coupled, directly or indirectly, to optimization controller 142.

In another example, the optimization controller is distributed and comprises onboard and offboard processors with access to offboard data through the V2I network and onboard data through the V2I or V2V network.

The dynamic nature of platooning requires that the vehicles in a platoon know when a vehicle joins or separates. Some communication techniques for informing vehicles about the forming, joining, or separating from platoons are known. The platoon or a non-member vehicle may initiate a request for information or may broadcast information including characteristics of the platoon or vehicle, such as health, route, and mass/shape variables (or characteristics thereof). With this information the vehicle and the platoon can make optimal joining decisions.

In one embodiment, a platoon may reject a vehicle if the health of the vehicle is below a health threshold of the platoon. By rejecting the unhealthy vehicle the platoon may maintain its health and increase the likelihood of avoiding a disruptive event caused by the unhealthy vehicle. In another embodiment, a platoon may reject a vehicle if the route of the vehicle does not overlap with the route of the platoon for a distance at least equal to an overlap threshold. By rejecting the vehicle the platoon may increase the likelihood of avoiding a disruptive event caused by the vehicle. For example, the platoon may choose to reject a vehicle if accepting the vehicle would prevent the platoon from accepting another vehicle that has a longer route overlap. In a similar fashion a vehicle may consider the health and route of platoons to determine whether to seek to join them, seeking to optimize its performance parameters by finding the best fit and minimizing the effects of disruptions.

In some embodiments, the health and route/disruptions of the platoon may be determined and used to determine whether a target vehicle should join the platoon. In particular when the fuel consumption estimated for joining different platoons is not very different (e.g. falls within a narrow previously established band), it may be desirable for a healthy vehicle to join a healthy platoon or for an unhealthy vehicle to not join a healthy platoon. Health (H) may be based on health indicators. Potential health indicators include present number of fault codes, time to last service event, maximum power capability, maximum brake capability, and stopping distance. Brake capability and stopping distance may be standardized based on original specifications. Active fault codes comprise fault codes from engine, powertrain, and other onboard subsystems. Maximum braking power available is based on the current wear estimates, brakes pressure available, and temperature of the brake pads. Minimum stopping distance is based on the GVW of each vehicle combined with the maximum braking power available to each of the vehicles.

In one example, the health of the vehicle is determined based on the worse of the health indicators, which statistically may be a good representation of the likelihood of a disruption caused by the vehicle. In another example, the health of the vehicle is determined as a weighted average of a selected number (n, where n>1) of the health indicators, where H=a1×(health indicator #1)+ . . . a(n)×(health indicator # n). In a further example, the health of the vehicle is determined as a weighted average of the health indicators, where H=a1×(average number of fault codes)+a2×(average time to last service event)+a3×(average power capability)+ a4×(average brake capability)+a5×(average stopping distance). In each example a1 . . . a(n) are previously established constants, which may be established based on likelihood of failure models correlating the variables to likely failure.

Health and route/disruptions may be based on the number of vehicles in the platoon (n). FIG. 4 depicts an embodiment of process to determine platoon health, depicted by a list of process steps. Although the steps are numbered, the order in which the calculations are performed is not mandatory and the steps may be performed in any order, subject to the inherent relationship demanded by the steps, e.g. if the result of a step is used in another step, an order as to these two steps is inherent. In one example, the health of the platoon is determined as the average of the health of each of the platoon members. In another example, the health of the platoon is determined based on the health of the platoon member having the worse health, which statistically may be a good representation of the likelihood of a disruption. In a further example, the health of the platoon is determined as the average of the health of a selected number (n, where n>1) of the platoon members.

Route overlap may be determined by finding matching route segments and summing the distances of matched segments. In some embodiments, a vehicle controller of a platoon, or an optimization controller of a vehicle in the platoon, determines at least some of the number of vehicles in the platoon, the route of each vehicle, the maximum overlap distance of a subset m of vehicles (m{2 . . . n}), and the label length segments based on the Advanced Driver Assistance System (ADAS) format (with GPS locations at key transitions) to determine the overlap of the platoon members. An exemplary embodiment is shown in FIG. 5. Although the steps are numbered, the order in which the calculations are performed is not mandatory and the steps may be performed in any order, subject to the inherent relationship demanded by the steps, e.g. if the result of a step is used in another step, an order as to these two steps is inherent. As depicted, the process identifies the maximum route overlap by m vehicles. Ideally this number is large, indicating that m vehicles are travelling together for a large portion of their routes. The controllers, or any of them, and then broadcast full or partial descriptors based on the percentage of platoon information, wherein 100% represents n vehicles, 50% represents n/2 vehicles, etc. Assuming good health, a platoon with long route overlap amongst all its members is likely to experience few disruptions. As overlap decreases overall over an increasing number of its members, the platoon will experience more disruptions.

In some embodiments, vehicles broadcast information descriptive of their characteristics (the "vehicle datasets") in sufficient detail to enable the foregoing determinations to join, form new, or separate. Exemplary information includes location (e.g. current GPS coordinates or road/mile indicator or triangulated position based on cell towers), heading (e.g. N/S/E/W, or compass direction to within some prescribed resolution), average velocity, current velocity, average fuel consumption, mass, propulsion power of powertrains, current route, and current health. Other statistical descriptors of these variables may also be used such as minimum or maximum.

In some embodiments, platoons broadcast information descriptive of their characteristics (the "platoon datasets") in sufficient detail to enable the foregoing determinations to join, form new, or separate. Exemplary information includes lead vehicle identification (e.g. license plate number or VIN), location (e.g. current GPS coordinates or road/mile indicator or triangulated position based on cell towers), heading (e.g. N/S/E/W, or compass direction to within some prescribed resolution), average current group velocity, average group mass, average group inter-vehicle separation distance, last vehicle expected distance till break-away from platoon, average propulsion power of platoon powertrains, number of vehicles in platoon, average effectiveness (e.g. average increase in fuel economy, or $C_d$ & A of each vehicle in platoon, or $C_d \times A$ of platoon, which may be determined by the optimization controller (onboard or offboard), current route, and current health of the platoon. In addition to platoon averages, individual vehicle data may also be broadcasted. Other statistical descriptors may also be used such as minimum or maximum.

A platoon may receive the vehicle dataset of a vehicle wishing to join the platoon and may use the information in the vehicle dataset to determine whether to accept the vehicle into the platoon, and then modify the platoon dataset by incorporating the vehicle dataset. Optimization controller 142, which is an onboard controller, may be programmed to receive the vehicle dataset and modify the platoon dataset. The vehicle and platoon datasets maybe stored in memory integrated with the controller or communicatively coupled with the controller.

In some embodiments, the optimization controller is vehicle-centric and thus determines the optimal joining decision for itself. The optimal joining decision may be based on a least fuel consumption of the individual vehicle while meeting mission time constraints of the individual vehicle by considering the individual vehicle options and the previously identified variables and constraints. The optimal joining decision may be based on a combination of fuel consumption, health and route. Ultimately the optimal decision may be the one that yields the highest economic value after factoring the risks associated with health and route. Accordingly, if a joining decision only yields high economic value if the platoon does not experience any breakdowns, but the platoon has a poor health, then the likely economic value, after adjustment for risk, may not be as high as the economic value resulting from joining a different platoon. The actual economic value need to be computed, it suffices to determine, as between many options, which option is more valuable than the others.

In some embodiments, the optimization controller is system-of-systems centric and thus determines the optimal joining decision based on the relative value of the decision based on its effect on all nearby vehicles. The optimal joining decision may be based on a least fuel consumption of all the vehicles while meeting mission time constraints of all the vehicles by considering the target vehicle options and the previously identified variables and constraints. In one example, the fuel consumption of each vehicle can be determined for each of a multitude of permutations of the vehicles and platoons, then the minimum of the sum of fuel consumptions for each permutation is identified to determine the optimal platooning arrangement. Some permutations need not be considered if they have no practical value. For example, if two vehicles of substantially equal mass and shape are already lagging behind a lead vehicle, a permutation that considers switching their order would not necessarily affect the minimum total fuel consumption.

Before evaluating a permutation, health, route, and vehicle limitations that would preclude implementation of the permutation may be considered, and the calculations pertaining to a permutation that cannot be implemented may be curtailed, thereby reducing the computational cost. In this manner the data analysis and data transfer burden may be reduced. In one embodiment, if a vehicle has a health or route overlap value below the health or route overlap threshold of a platoon, the evaluation of the permutation including that platoon can be eliminated. Similarly, if the average speed of the platoon is near the speed limit of a vehicle, the option for that vehicle to join that platoon may be eliminated.

Additional computational cost can be eliminated by broadcasting joining requests before performing the computations. In one example, a vehicle broadcasts the vehicle dataset with a request to join a platoon. If a platoon responds by rejecting the request, then it is not necessary to assess the value of joining the platoon. Because the vehicle dataset includes a vehicle identification, the platoon can reject the request by broadcasting a rejection of the request associated with the vehicle identification. Alternatively, the platoon datasets may include platoon joining requirements, e.g. health, affiliation, etc. and the vehicle optimization controller may then determine if the vehicle is permitted to join the platoon before determining whether the vehicle should want to join the platoon.

Fuel consumption determination (forecasting) is based on the efficiency of the powerplant and powertrain of the vehicle, as well as the expected terrain and platoon based dynamic power loadings on the powertrain of the vehicle. Fuel consumption determinations can be improved by incorporating traffic data (not only the data about the traffic between the vehicle and the platoons—as discussed in this disclosure—but also traffic data through the mission) as described further below.

The optimization controller may perform computations of various complexity, including low, medium and high complexity computations, to determine a velocity profile, target platoon (leading, trailing, or new), and, optionally, intra-platoon separation distance. In one example, low complexity computations comprise mission route horizon, distance to forward platoon, speed of forward platoon, distance to rear platoon, speed of rear platoon, maximum velocity, road speed limit, forward road grade profile, fuel map, vehicle mass, and vehicle dynamic parameters. In one example, medium complexity computations comprise low complexity computations plus traffic amount and velocity to the leading platoon, and traffic amount and velocity to the trailing platoon. In a further example, high complexity computations comprise medium complexity computations plus neighboring vehicles requirements and constraints.

Figure 6:
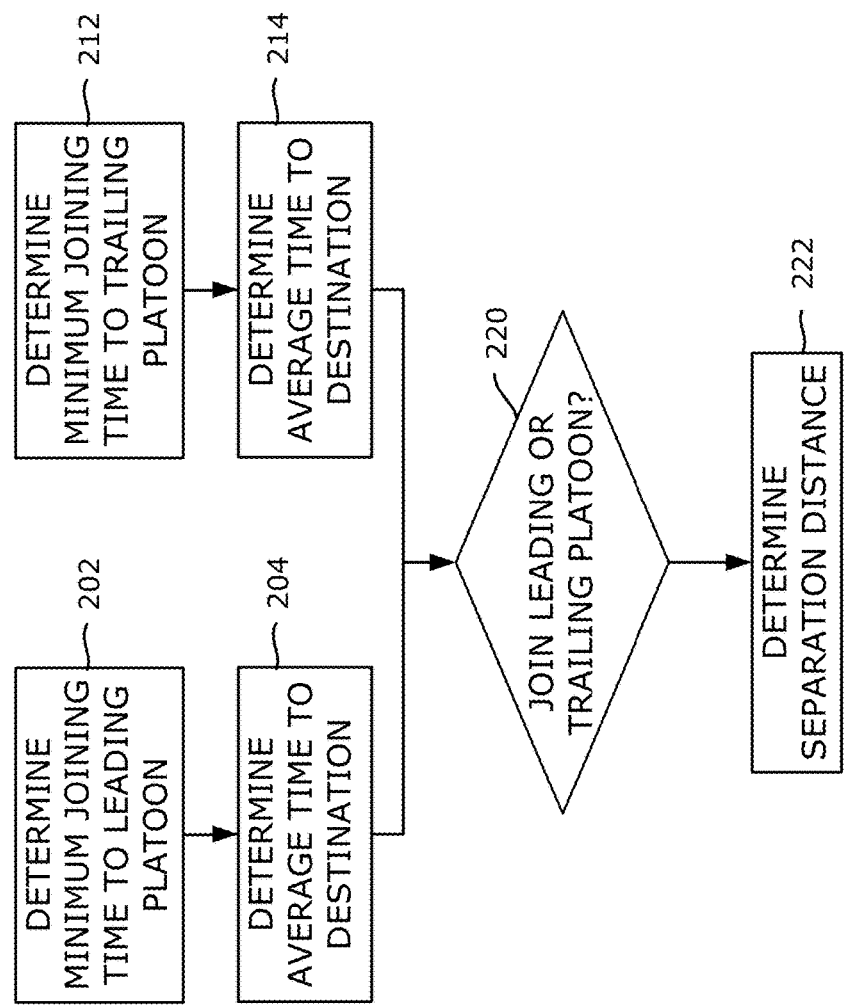
FIG. 6 is a flowchart of a method for optimizing fuel consumption of a vehicle entering a roadway on which leading and trailing platoons travel.

An embodiment of a low complexity optimization method will now be described with reference to FIG. 6, in which a flowchart 200 is shown. The method is performed by an optimization controller based on data transmitted by the transceivers of the vehicles. The optimization controller may be onboard, offboard, or distributed. The optimization controller may be mounted on a combustion engine of the vehicle or encompassed by the engine controller. The method begins at 202, where the minimum joining time to the leading platoon is determined, and, at 204, the average time to the destination is determined, and based on the determinations the fuel consumption is determined for the case in which the target vehicle joins the leading platoon. The fuel consumption may be based on the average platoon speed, road terrain, and relative location of the target vehicle (e.g. drafting the last vehicle of the leading platoon).

At 212, the minimum joining time to the trailing platoon is determined, and, at 214, the average time to the destination is determined, and based on the determinations the fuel consumption is determined for the case in which the target vehicle joins the trailing platoon. The fuel consumption may be based on the average platoon speed, road terrain, and relative location of the target vehicle (e.g. not drafting). Although not shown in flowchart 200, in one variation described further below the same computations are performed for various scenarios in which the target vehicle leads or follows a new platoon (or travels alone, at least initially), the difference being that the new platoon may have a more optimal speed to reduce time to destination and thus fuel consumption relative to leading the trailing platoon or the fuel needed to join the leading platoon relative to the benefit of drafting.

At 220, a determination is made regarding the relative position of the target vehicle, as whether to join the leading or trailing platoon.

Responsive to the relative position determination, at 222, a separation distance determination is made. The separation distance may be based on vehicle mass. If joining the leading platoon, the controller uses the masses of the last vehicles in the platoon and the target vehicle to determine the maximum braking stopping distance for each vehicle and then computes the minimum separation distance as the difference in maximum braking stopping distances. If the mass of the last vehicle is unknown, the controller assumes it has the lowest Class mass (thus assume it will have a short stopping distance, which results in a long separation distance). If joining the trailing platoon, the controller assumes the masses of the first vehicle in the platoon and the target vehicle to determine the maximum braking stopping distance for each vehicle and then compute the minimum separation distance as the difference in maximum braking stopping distances. If the mass of the first vehicle is unknown, the controller assumes it has the maximum Class 8 mass. Terrain and braking characteristics may be incorporated in the computation to more accurately determine the maximum braking stopping distances.

In a variation of the foregoing embodiment, the vehicle controllers compute braking distances based on actual braking information obtained in transit, which may be adjusted by the vehicle controllers based on the terrain grade when the actual braking information was obtained. Of course the vehicle controllers may determine maximum braking stopping distances in any manner and then transmit these to the optimization controller.

In an embodiment of a medium complexity optimization method, the determination of the minimum joining time at 202, 212 takes into account the impact of traffic. Traffic may be impacted by average traffic speed, number of vehicles, and the increase or decrease of vehicles in traffic within the zone of interest, which is delimited by the distance between the target vehicle and the platoon, said distance decreasing over time until the target vehicle joins the platoon, at which time said distance is the separation distance. Traffic may require the target vehicle to use a less than optimal speed profile if a vehicle in the zone of interest is travelling slow, for example. Thus, without traffic the target vehicle may optimally join the leading platoon, with traffic it may optimally join the trailing platoon, or vice versa.

In an embodiment of a high complexity optimization method, in addition to the steps performed for the medium complexity optimization method the method includes analysis of neighboring vehicle requirements and constraints. The analysis includes determining the number of neighboring vehicles requiring a platoon (n), determining the average time to destination for a new platoon (n vehicles plus target vehicle) based on an average speed of the new platoon, determination of fuel consumption for each vehicle of the new, leading, and trailing platoons, determining which option results in lowest fuel consumption for the target vehicle, determining a target platoon and position (leading/trailing/new and trailing/leading/either). Then, based on the target platoon and position, generating a target velocity profile, determining separation distance, and potentially informing the neighboring vehicles requiring a platoon that a new platoon is being formed. For the new platoon the separation distance is determined as above, based on the relative positions of the n vehicles and the target vehicle.

FIGS. 7, 8, and 9 depict additional embodiments of low, medium, and high complexity processes to optimize platooning decisions. Each embodiment is depicted by a list of process steps. Although the steps are numbered, the order in which the calculations are performed is not mandatory and the steps may be performed in any order, subject to the inherent relationship demanded by the steps, e.g. if the result of a step is used in another step, an order as to these two steps is inherent.

The optimization controller may consider the fuel consumption, health, and route overlap as variables in a model to compute a number that is a proxy for economic value. The constants associated with the variables may be weighed, such that lower fuel consumption, higher health, and higher route overlap result in a higher proxy number. The proxy numbers for two platoons can then be compared to determine which of the two platoons is a more attractive choice for the vehicle. In one example the model is linear. Non-linear models may also be construed. In another example, the health variable is binomial and is assigned a value of 0 if health is below the health threshold and a value of 1 if it is above the health threshold. The route overlap variable can similarly be binomial in the model.

In one embodiment of an optimization method, the method depicted with reference to flowchart 200 is enhanced by, in addition to considering fuel consumption as a decision factor, considering health and route overlap. Any of the models depicted in the present disclosure may be used. In a variation of the present embodiment, the determination of the minimum joining time at 202, 212 takes into account the impact of traffic, as described above. The analysis to select the optimal platoon may further include determining whether a new platoon should be formed and then selecting between the new, leading, and trailing platoons an optimal platoon for the vehicle to join, in the manner described previously.

In some of the embodiments of an optimization method described herein, health and route overlap thresholds may be used to reduce computation costs. The thresholds must thus be exceeded before a platoon will be considered. If the platoon is not sufficiently healthy or does not exhibit sufficient route overlap by its members, the optimization controller will ignore it when seeking a platoon for the vehicle to join. In a variation of the present embodiment, insufficient health or route overlap alone may suffice to exclude a platoon from consideration. Similarly, if fuel consumption is substantially equal (within an acceptable range), one or both of health and route overlap difference may be used to identify the optimal platoon for the vehicle to join. For example, if fuel consumption is not a factor, then a substantially healthier platoon will be optimal, even without considering route overlap. A difference of 25% may be considered to be substantial.

Platooning vehicles may comprise groups of 2-4 class 8 tractor trailers. However, as driving factors evolve and the use of platoons increase on roadways, platoons may comprise vehicles in different classes and the number of vehicles may increase. Of course as the dimension variations and number of vehicles in a platoon increase, the computational complexity also increases. In addition, the joining determination need not be permanent. A vehicle that has previously joined a platoon may join another platoon. In some embodiments, each vehicle has an optimization controller that determines the optimal organizational selection of the vehicle.

The optimization methods described above for a target vehicle can be performed periodically or continually by the vehicle optimization controller, by comparing the value of joining one platoon versus another. Joining a different platoon may change the speed and relative position of the vehicle, and the effect of drafting (or not) on fuel efficiency. Periodic or continuous reassessment is needed as the platoons change due to vehicles separating from the platoon as they reach their destinations, for example, or new platoons are formed. As discussed previously, the economic value can be predicated on fuel consumption to destination, health, and route analysis comparisons.

In certain embodiments, the optimization, vehicle or engine controller forms a portion of a processing subsystem including one or more computing devices having non-transient computer readable storage media, processors or processing circuits, and communication hardware. The controller may be a single device or a distributed device, and the functions of the controller may be performed by hardware and/or by processing instructions stored on non-transient machine readable storage media. Example processors include an application specific integrated circuit (ASIC), a field programmable gate array (FPGA), a digital signal processor (DSP), and a microprocessor including firmware. Example non-transient machine readable storage media includes random access memory (RAM), read only memory (ROM), flash memory, hard disk storage, electronically erasable and programmable ROM (EEPROM), electronically programmable ROM (EPROM), magnetic disk storage, and any other medium which can be used to carry or store processing instructions and data structures and which can be accessed by a general purpose or special purpose computer or other processing device.

In certain embodiments, the optimization, vehicle or engine controller includes one or more modules structured to functionally execute the operations of the controller. The description herein including modules emphasizes the structural independence of certain aspects of the controller, and illustrates one grouping of operations and responsibilities of the controller. Other groupings that execute similar overall operations are understood to be within the scope of the present application. Modules may be implemented in hardware and/or as processing instructions on a non-transient computer readable storage medium. Modules may be distributed across various hardware or computer based components. Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an operational amplifier integrated circuit, analog control elements (springs, filters, integrators, adders, dividers, gain elements), and/or digital control elements.

Certain operations described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or pulse-width-modulation signal) indicative of the value, receiving a computer generated parameter indicative of the value, reading the value from a memory location on a non-transient machine readable storage medium, receiving the value as a run-time parameter by any means known in the art, and/or by receiving a value by which the interpreted parameter can be calculated, and/or by referencing a default value that is interpreted to be the parameter value.

The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein.

Except where a contrary intent is expressly stated, terms are used in their singular form for clarity and are intended to include their plural form. As used herein, the terms "comprising" and "including" denote open transitions. A claim in which the open transition is used is not limited to the elements following the open transition. Occurrences of the phrase "in one embodiment," or "in one aspect," herein do not necessarily all refer to the same embodiment or aspect.

The terms "first," "second," "third," "fourth," and the like in the description and in the claims are used for distinguishing between similar elements and not necessarily for describing a particular sequential or chronological order. Any terms so used are interchangeable under appropriate circumstances. Thus, if a method is described herein as comprising a series of steps, the order of such steps as presented herein is not necessarily the only order in which such steps may be performed, and certain of the stated steps may possibly be omitted and/or certain other steps not described herein may possibly be added to the method. Additionally, an element may be referred to as a first element in an independent claim and as a second, third or other element in a different independent claim, therefore a first element in one independent claims is not necessarily the same element as a first element in a different independent claim.

While the embodiments have been described as having exemplary designs, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

The invention claimed is:

1. A method for selecting a platoon, the method comprising:

determining, by an optimization controller, values of a performance parameter of a target vehicle using characteristics of at least two platoons travelling on a roadway, each of the values corresponding to a platoon of the at least two platoons;

selecting, by the optimization controller, one of the at least two platoons based on a comparison of the values of the performance parameter, and coordinating, by the optimization controller, for the target vehicle to join the selected of the at least two platoons, wherein the performance parameter is an expected fuel consumption, wherein the at least two platoons comprise a first platoon and a second platoon, and wherein the values of the performance parameter are determined using a present location and a target destination of the target vehicle and comprise a first expected fuel consumption value of the target vehicle based on the target vehicle joining the first platoon and a second expected fuel consumption value of the target vehicle based on the target vehicle joining the second platoon, and wherein coordinating, by the optimization controller, for the target vehicle to join the selected of the at least two platoons comprises coordinating for the target vehicle to join the first platoon if the second expected fuel consumption value is greater than the first expected fuel consumption value.

2. The method of claim 1, further comprising receiving, by the optimization controller, a platoon dataset for each of the at least two platoons, the platoon datasets representing the characteristics of the at least two platoons, the characteristics including at least one of location, speed, health, and route overlap of the respective platoon.

3. The method of claim 2, wherein the optimization controller is configured to prevent selecting a platoon if the health of the target vehicle is below a health threshold of the platoon.

4. The method of claim 2, wherein the optimization controller is configured to prevent selecting a platoon if the route overlap between the platoon and the target vehicle is below a route overlap threshold of the platoon.

5. The method of claim 2, wherein the performance parameter is a model output from a model, the model including at least one of the health and the route overlap of each one of the at least two platoons.

6. The method of claim 1, wherein the method further comprises receiving vehicle datasets from vehicles which are not members of any of the at least two platoons, and generating, by the optimization controller, new platoon characteristics based on the vehicle datasets, and wherein the comparison of the values of the performance parameter comprises comparing values of the performance parameter of the target vehicle determined using the characteristics of the new platoon.

7. The method of claim 1, wherein coordinating for the target vehicle to join the first platoon comprises transmitting, by the optimization controller, instructions to the target vehicle to join the first platoon.

8. The method of claim 7, wherein the optimization controller is an onboard controller of a vehicle in the first platoon or the second platoon.

9. The method of claim 7, wherein the optimization controller is an offboard controller.

10. The method of claim 1, wherein the optimization controller is on the target vehicle, and wherein coordinating for the target vehicle to join the first platoon comprises transmitting, by the optimization controller, instructions to the first platoon to receive the target vehicle.

11. The method of claim 1, wherein determining, by the optimization controller, the first expected fuel consumption value and the second expected fuel consumption value comprises using static data including at least one of terrain and weather data.

12. The method of claim 11, wherein determining, by the optimization controller, the first expected fuel consumption value and the second expected fuel consumption value comprises using dynamic data including traffic data.

13. The method of claim 12, further comprising receiving, by the optimization controller, the traffic data.

14. An optimization controller comprising optimization logic configured to:
determine values of a performance parameter of a target vehicle using characteristics of at least two platoons travelling on a roadway, each of the values corresponding to a platoon of the at least two platoons;
select one of the at least two platoons based on a comparison of the values of the performance parameter; and
coordinate for the target vehicle to join the selected of the at least two platoons,
wherein the performance parameter is an expected fuel consumption, wherein the at least two platoons comprise a first platoon and a second platoon, and wherein the values of the performance parameter are determined using a present location and a target destination of the target vehicle and comprise a first expected fuel consumption value of the target vehicle based on the target vehicle joining the first platoon and a second expected fuel consumption value of the target vehicle based on the target vehicle joining the second platoon, and
wherein the optimization logic is configured to coordinate for the target vehicle to join the selected of the at least two platoons by coordinating for the target vehicle to join the first platoon if the second expected fuel consumption value is greater than the first expected fuel consumption value.

15. The optimization controller of claim 14, wherein the optimization controller is further configured to prevent selecting a platoon if a health of the target vehicle is below a health threshold of the platoon.

16. The optimization controller of claim 14, wherein the optimization controller is further configured to prevent selecting a platoon if a route overlap between the platoon and the target vehicle is below a route overlap threshold of the platoon.

17. A combustion engine for a target vehicle, the combustion engine comprising:
an engine controller;
a vehicle-to-vehicle (V2V) transceiver to receive platoon characteristics from at least two platoons traveling on a roadway; and
an optimization controller communicatively coupled with the engine controller and the V2V transceiver, the optimization controller including optimization logic operable to:
determine values of a performance parameter of the target vehicle using the characteristics of the at least two platoons travelling on a roadway, each of the values corresponding to a platoon of the at least two platoons;
select one of the at least two platoons based on a comparison of the values of the performance parameter; and
coordinate for the target vehicle to join the selected of the at least two platoons,
wherein the performance parameter is an expected fuel consumption, wherein the at least two platoons comprise a first platoon and a second platoon, and wherein the values of the performance parameter are determined using a present location and a target destination of the target vehicle and comprise a first expected fuel consumption value of the target vehicle based on the target vehicle joining the first platoon and a second expected fuel consumption value of the target vehicle based on the target vehicle joining the second platoon, and
wherein the optimization logic is configured to coordinate for the target vehicle to join the selected of the at least two platoons by coordinating for the target vehicle to join the first platoon if the second expected fuel consumption value is greater than the first expected fuel consumption value.

18. The combustion engine of claim 17, wherein coordinating for the target vehicle to join the selected of the at least two platoons comprises causing the V2V transceiver to transmit characteristics of the target vehicle to the selected platoon.

* * * * *